(12) United States Patent
Lederer et al.

(10) Patent No.: US 7,914,063 B2
(45) Date of Patent: Mar. 29, 2011

(54) FUEL TANK COVER MODULE

(75) Inventors: Lars Lederer, Rothenburg (DE); Christian Zentner, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 11/959,087

(22) Filed: Dec. 18, 2007

(65) Prior Publication Data

US 2008/0149640 A1    Jun. 26, 2008

(30) Foreign Application Priority Data

Dec. 20, 2006    (DE) .......................... 10 2006 061 218

(51) Int. Cl.
*B60K 15/05* (2006.01)
(52) U.S. Cl. ..................................... 296/97.22; 292/207
(58) Field of Classification Search ............... 296/97.22, 296/37.6; 180/202; 292/207, 201, 280, 144
See application file for complete search history.

(56) References Cited

U.S. PATENT DOCUMENTS

| | | | |
|---|---|---|---|
| 5,044,678 A | | 9/1991 | Detweiler |
| 5,533,766 A | * | 7/1996 | Farber ........................... 292/144 |
| 5,664,811 A | * | 9/1997 | Martus et al. .................. 292/144 |
| 5,906,406 A | * | 5/1999 | Pajakowski ................ 296/97.22 |
| 7,185,938 B2 | * | 3/2007 | Beck ........................... 296/97.22 |
| 2005/0194810 A1 | * | 9/2005 | Beck ........................... 296/97.22 |

FOREIGN PATENT DOCUMENTS

| | | |
|---|---|---|
| DE | 1362733 U | 1/1936 |
| DE | 4242228 A1 | 6/1994 |
| DE | 19845088 A1 | 4/2000 |
| DE | 69802030 T2 | 7/2002 |
| DE | 10137035 A1 | 2/2003 |
| DE | 102004002818 A1 | 8/2005 |
| EP | 0736406 A1 | 10/1996 |
| EP | 1557313 A2 | 7/2005 |
| EP | 1571029 A2 | 9/2005 |

OTHER PUBLICATIONS

European Patent Office, European Search Report for European Application Number 07024176.5, May 20, 2008.
Chinese Patent Office, Office Action for Chinese Application Number 200710306245.7, Aug. 21, 2009.

* cited by examiner

*Primary Examiner* — Glenn Dayoan
*Assistant Examiner* — Pinel E Romain
(74) *Attorney, Agent, or Firm* — Ingrassia Fisher & Lorenz, P.C.

(57) ABSTRACT

A fuel tank cover module for installation in a motor vehicle is described. The fuel tank cover module comprises a trough body and a hinge arm, which is fastened to the trough body and configured to receive a fuel tank cover and which is mounted pivotably about a pivot pin on the trough body and on its end remote from the pivot pin has a locking portion. The fuel tank cover module further comprises a locking element, which for locking and unlocking the fuel tank cover can be changed over by means of a control unit between a locking position, in which the locking element engages into the locking portion, and a release position, in which the locking element does not engage into the locking portion. The control unit is disposed on the outside of the trough body in the region of the pivot pin. Furthermore, the locking element engages around the trough body.

18 Claims, 2 Drawing Sheets

FUEL TANK COVER MODULE

CROSS-REFERENCE TO RELATED APPLICATION

This application claims priority to German Application No. DE 10 2006 061 218.3, filed Dec. 20, 2006.

TECHNICAL FIELD

The present invention relates to a fuel tank cover module for installation in a motor vehicle comprising a trough body and a hinge arm, which is fastened to the trough body and configured to receive a fuel tank cover and which is mounted pivotably about a pivot pin on the trough body and on its end remote from the pivot pin has a locking portion, and comprising a locking element, which for locking and unlocking the fuel tank cover can be changed over by means of a control unit between a locking position, in which the locking element engages into the locking portion, and a release position, in which the locking element does not engage into the locking portion.

BACKGROUND

A fuel tank cover module of this type is known for example from EP 0 736 406 A1. In this fuel tank cover module, for locking the fuel tank cover the control unit in the form of a servomotor is formed separately from the fuel tank cover module and fastened at the locking side of the fuel tank cover module to the vehicle body. By means of the servomotor a locking rod, which extends from the servomotor in the direction of the locking portion, may be moved to and fro, thereby effecting locking and unlocking of the fuel tank cover. The drawback of this known arrangement is the relatively large outlay for the final assembly as the servomotor with the locking rod and the actual fuel tank cover module have to be assembled separately in separate operations. Furthermore, because of the separate design of servomotor and fuel tank cover module this known arrangement has a relatively large spatial requirement.

SUMMARY

An object of the present invention is to design a fuel tank cover module of the initially described type in such a way that both the spatial requirement and the outlay for the final assembly may be reduced.

Proceeding from a fuel tank cover module of the initially described type, this object is achieved according to the invention in that the control unit is disposed on the outside of the trough body in the region of the pivot pin and that the locking element engages in sections around the trough body.

By disposing the control unit in the region of the pivot pin on the outside of the trough body a very compact style of construction and hence a very low spatial requirement is achieved. In contrast to the conventional arrangement of the control unit at the locking side of the fuel tank cover module, according to the invention the control unit is therefore disposed at the side of the fuel tank cover module remote from the locking side in order to achieve a more compact style of construction of the fuel tank cover module. At the same time, by virtue of the locking element engaging around the trough body it is however guaranteed that despite this unusual positioning of the control element a locking of the fuel tank cover on the side remote from the pivot pin is possible. In this way, a more stable locking is achieved than would be possible in the case of a locking provided on the pivot pin side.

According to an advantageous form of construction of the invention, the control unit in the installed state of the fuel tank module is disposed above or below the hinge arm. In these regions there is usually sufficient free space, while at the same time the distance between the control unit and the locking portion and hence the length of the locking element is minimized.

The trough body preferably comprises a laterally projecting housing extension, in which the pivot pin of the hinge arm is disposed. The control element in this case may be disposed advantageously on the outside of the housing extension, in particular on the top or the underside thereof. Thus, by fitting the control element on the lateral housing extension the fuel tank cover module has projecting elements at one side only. It is thereby guaranteed that, in order to insert the fuel tank cover module into an aperture in the vehicle body that usually corresponds to the external contour of the fuel tank cover, the fuel tank cover module may be introduced, projecting region first, into the corresponding aperture before then being fastened, for example latched, by corresponding tilting of the fuel tank cover module in the vehicle body aperture. The combination of control element and housing extension therefore allows trouble-free installation of the fuel tank cover module from outside through the vehicle body aperture.

According to a further advantageous form of construction of the invention the trough body has an aperture, through which the locking element engages, wherein in the closed state of the fuel tank cover the locking portion is disposed adjacent to the aperture. This aperture may in this case preferably be configured as a guide for the locking element. Thus, despite the remote positioning of the control unit that moves the locking element, this guide aperture guarantees precise guidance of the locking element particularly in the region of the part of the locking element that interacts with the locking portion. In principle, guide elements for the locking element that engages around the trough body may also be additionally provided at further points of the trough body.

According to a further preferred form of construction of the invention the locking element is of a hook-shaped, in particular J-shaped configuration. By virtue of the hook-shaped design the locking element may be adapted in a very space-saving manner to the external contour of the trough body. In particular, the locking element may comprise an elongate base portion that engages at the control unit, a middle portion that adjoins and extends obliquely or transversely relative to the base portion, and an end portion that adjoins the middle portion and is configured to engage into the locking portion. Preferably, the end portion of the locking element may extend substantially parallel and in particular in the opposite direction to the base portion. It is thereby guaranteed that, upon an axial displacement of the locking element by means of the control unit, the end portion also executes a correspondingly parallel-offset, axial displacement and is therefore inserted into and removed from the locking portion through the guide aperture in the trough body.

According to a further advantageous form of construction of the invention the base portion and the end portion in the installed state of the fuel tank cover module are disposed substantially horizontally. An axial displacement of the locking element therefore corresponds likewise to a substantially horizontal displacement. The control element may accordingly also be disposed in such a way that the axis of motion of the control element is disposed likewise horizontally, with the result that the desired compact style of construction of the fuel tank cover module is achieved.

Preferably, the base portion and the end portion in the installed state of the fuel tank cover module are disposed mutually offset in vertical and horizontal direction. The middle portion in this case may be configured to extend in the shape of an arc and/or obliquely relative to the closed fuel tank cover, thereby achieving a space-saving design of the locking element that is adapted to the external contour of the trough body.

The direction of motion of the locking element advantageously extends substantially at right angles to the pivot pin. Given a correspondingly configured hinge arm, the locking element is therefore movable by means of the control unit in a direction extending substantially along a longitudinal axis of the hinge arm. This achieves the effect that the locking element, on the one hand, is of as short a design as possible and, at the same time, is disposed in a space-saving manner.

According to a further advantageous form of construction of the invention the control unit is configured as part of the preassembled fuel tank cover module. In particular, the control element may be detachably fastened, in particular plugged, pushed on, screw-fastened or latched on the trough body. It is in principle also possible for the control element to be non-detachably connected, for example by adhesion or integral casting, to the trough body. The detachable or non-detachable integral formation of the control element with the trough body not only reduces the spatial requirement but also markedly simplifies the final assembly. The preassembled fuel tank cover module in a single operation may be inserted into a corresponding aperture in the vehicle body and connected thereto, for example by latching, screw-fastening or fixing in some other way to the vehicle body.

According to a further preferred form of construction of the invention the control unit takes the form of a servomotor or electromagnet. In principle, any control unit is conceivable that allows the locking element to be loaded with a force acting in axial direction. In principle, it is however also possible for the locking element not to be displaced in longitudinal direction but for example rotated about a longitudinal axis, in particular about its base portion, thereby allowing the end of the locking element that engages in the locking portion to be moved out of the locking portion and back into the locking portion. To this extent, it is also conceivable to use control elements, by means of which a rotational movement may be transmitted to the locking element.

According to a further preferred form of construction of the invention the fuel tank cover is fastened, in particular plugged, pushed on, adhered, screw-fastened or latched on the hinge arm. In this way, the fuel tank cover may be adapted for example in colour to the colour of the vehicle body without the entire fuel tank cover module and/or the hinge arm having to be of a corresponding design. In principle, it is however also possible for the fuel tank cover to be formed integrally with the hinge arm.

Further advantageous forms of construction are indicated in the sub-claims.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
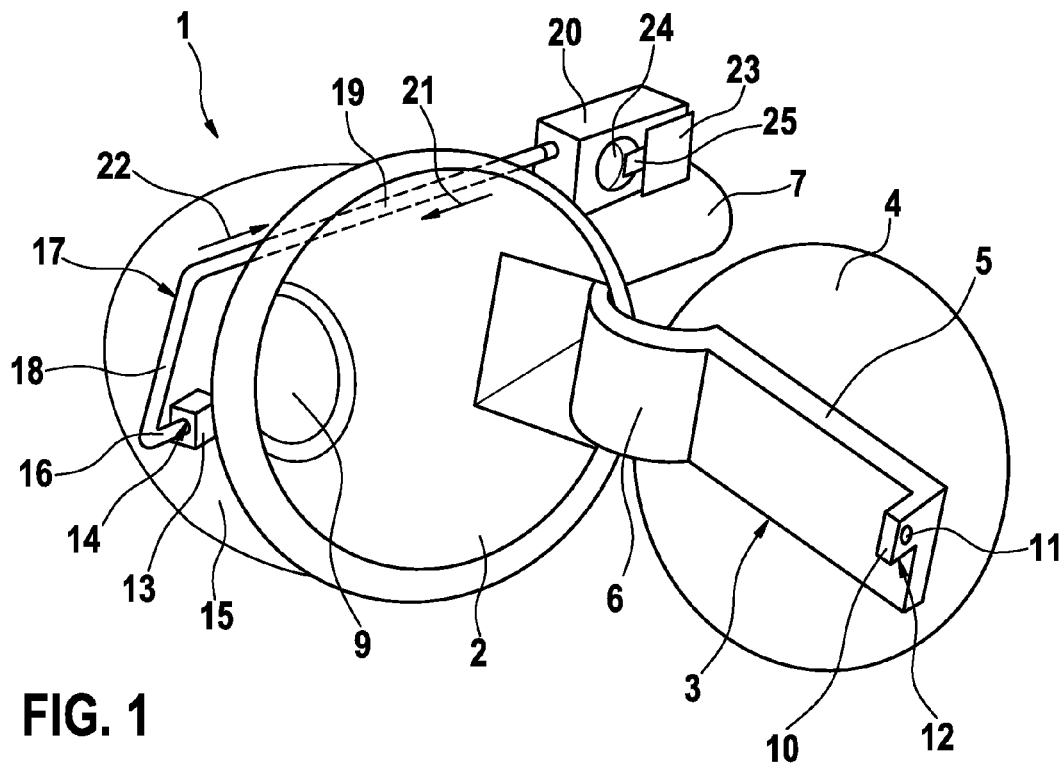
FIG. 1 shows a perspective view of a fuel tank cover module configured in accordance with the invention.

FIG. 1 shows a fuel tank cover module 1, which comprises a trough body 2 and a hinge arm 3, which is pivotably mounted on the trough body 2 and to which a fuel tank cover 4 is fastened.

The hinge arm 3 comprises an elongate portion 5, which is configured to receive the fuel tank cover 4, as well as an adjoining arc-shaped portion 6, which projects into a housing extension 7 formed laterally of the trough body 2 and is mounted pivotably about a pivot pin 8 (FIG. 2) in the housing extension 7.

Provided in the back region of the trough body 2 is an aperture 9, which is used to receive a non-illustrated filler neck.

Formed in the region of the free end of the hinge arm 3 is a lug 10 with a bore 11, which together form a locking portion 12.

Approximately opposite the housing extension 7 there is provided on the trough body 2 a guide element 13 having a guide aperture 14, which penetrates the wall 15 of the trough body 2 and in which an end portion 16 configured as a locking pin of a hook-shaped locking element 17 is guided. The guide element 13 having the guide aperture 14 in this case is so positioned that during closing of the fuel tank cover 4 the guide aperture 14 is aligned with the bore 11 of the locking portion 12 so that, when the hook-shaped locking element 17 is displaced in a direction according to the arrow 22, the end portion 16 configured as a locking pin of the locking element 17 engages into the bore 11 of the locking portion 12 and hence locks the fuel tank cover 4. In this state, the locking element 17 is situated in its locking position.

The end portion 16 of the locking element 17 is adjoined by a middle portion 18, which in turn is adjoined by a base portion 19 of the locking element 17 that is operatively connected to a control element 20, which is disposed on top of the housing extension 7. By means of the control element 20, which may for example take the form of a servomotor or electromagnet, the locking element 17 may be moved in axial direction, i.e. along the arrow 22 in the direction of the control element 20 as well as along the arrow 22 away from the control element 20.

Whereas, as already described, upon a movement in the direction of the arrow 22 the end portion 16 in the form of a locking pin of the locking element 17 engages, in the closed state of the fuel tank cover 4, into the bore 11 and is therefore situated in its locking position, upon a displacement in the opposite direction in accordance with the arrow 21 the end portion 16 of the locking element 17 is moved out of the bore 11 of the locking portion 12 and brought into its release position. In this position, the fuel tank cover 4 may be opened.

On top of the housing extension 7 a detent element 23 is formed, which is connected in a fixed manner to the housing extension 7 and into which the control element 20 is insertable for the purpose of fastening to the fuel tank cover module 1. For this purpose, detent recesses 24 are formed on the side walls of the control element 20 and interact with detent lugs 25 formed on the detent element 23 in order to retain the control element 20.

Whilst the trough body 2 and the hinge arm 3 are manufactured for example from plastics material, the locking element 17 is preferably formed from metal. As is evident from the Figures, the locking element 17 owing to its hook-shaped design engages around the trough body 2 in the back upper region thereof, wherein because of the hook-shaped design it is guaranteed that a displacement of the base portion 9 of the locking element 17 is converted into a corresponding displacement of the end portion 16. The end portion 16 in the form of a locking pin may therefore be moved freely to and fro in the guide aperture 14 substantially parallel to a longitudinal axis 26 of the elongate portion 5 of the hinge arm 5 (see FIGS. 2 and 3).

Figure 2:
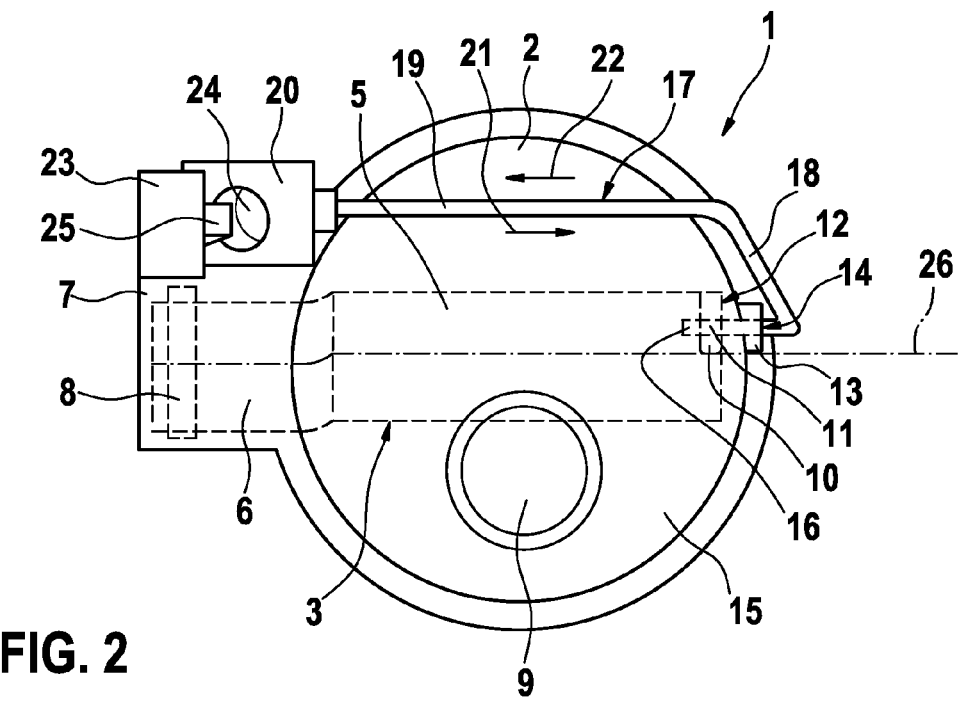
FIG. 2 shows a rear view of the fuel tank cover module according to FIG. 1.
Figure 3:
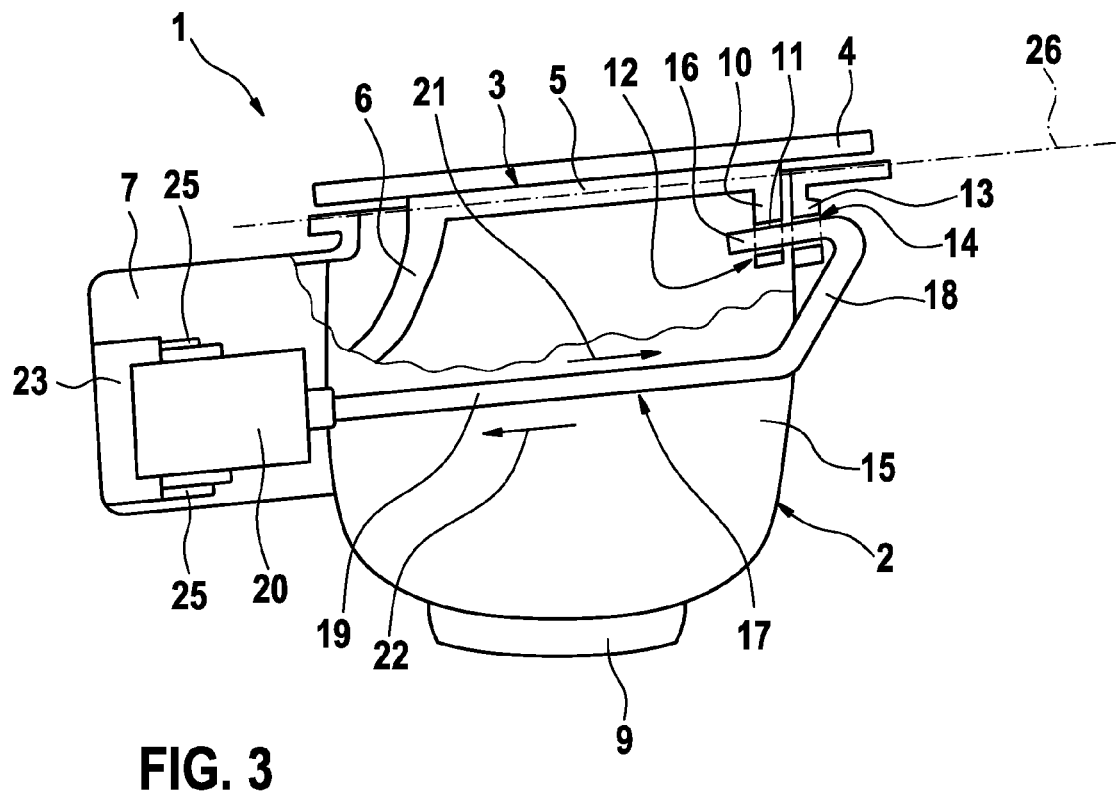
FIG. 3 shows a partly cut-open plan view of the fuel tank cover module according to FIG. 1.
Figure 4:
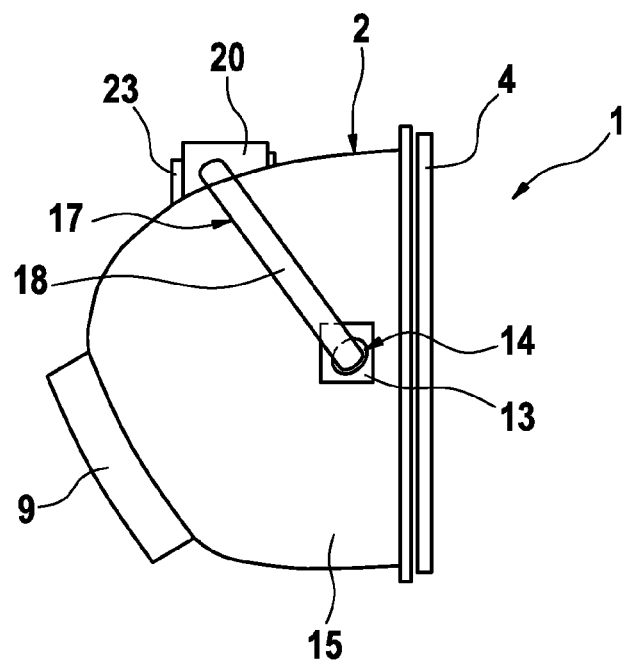
FIG. 4 shows a side view of the fuel tank cover module according to FIG. 1.

It is further evident from FIGS. 2 to 4 that the middle portion 18 of the locking element 17 extends from the substantially horizontally extending base portion 19 obliquely forwards and downwards and at the same time forwards and outwards to the end portion 16, which in turn projects substantially horizontally through the guide aperture 14 into the interior of the trough body 2. This construction of the locking element 17 such that it embraces sub-regions of the trough body 2 allows the control element 20 to be preassembled in a space-saving manner on the top or the underside of the housing extension 7, while at the same time a locking of the fuel tank cover 4 in the region of its end remote from the pivot pin 8 is possible. In this case, the embracing configuration of the locking element 17 hardly increases the external dimension of the fuel tank cover module 1.

The compact style of construction of the fuel tank cover module 1 according to the invention is moreover promoted by arranging the control element 20 in a horizontal position, in which the internal adjusting shaft of the control element 20 is disposed horizontally, on the top or the underside of the housing extension 7 because the housing extension 7 is conventionally of a suitable elongate design for receiving the arc-shaped portion 6 of the hinge arm 3 as well as the pivot pin 8.

The fuel tank cover module 1 configured in accordance with the invention may be manufactured together with the control element 20 and the locking element 17 as a preassembled unit, wherein by virtue of the arrangement of the control element 20 directly on the housing extension 7 it is guaranteed that the fuel tank cover module 1 is easily insertable from outside through a corresponding receiving aperture in the vehicle body. As the housing extension 7 together with the control element 20 are disposed on one side of the fuel tank cover module 1, it is possible, with the fuel tank cover module 1 in an inclined position, for this laterally projecting unit to be introduced first into the receiving aperture and then, by tilting the fuel tank cover module 1, for this projecting unit to be positioned laterally alongside the receiving aperture behind the body panel. Thus, the trough body 2 may be fully inserted into the receiving aperture and fastened therein, for example by latching.

The entire installation of the fuel tank cover module 1 may therefore be effected in a single process step. It is merely necessary, prior to insertion of the fuel tank cover module 1, to connect the control element 20 to electric connecting cables, which are conventionally disposed in a prepared manner in the receiving aperture. After connection and installation of the fuel tank cover module 1, it may be locked and unlocked by means of the control element 20, for example triggered by the central locking of a vehicle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. Fuel tank cover module for installation in a motor vehicle including a fuel tank cover, the fuel tank cover module comprising:
    a trough body;
    a hinge arm, configured to receive the fuel tank cover and mounted pivotably about a pivot pin on the trough body;
    a locking portion on the hinge arm at an end remote from the pivot pin;
    a rigid locking element movable between a locking position and an unlocking position; and
    a control unit configured to move the rigid locking element between the locking position and the unlocking position;
    wherein the rigid locking element extends through the trough body and into the locking portion in the locking position, and is released from the locking portion in the unlocking position; and
    wherein the control unit is disposed on the outside of the trough body in the region of the pivot pin and the locking element extends from the control unit at least partially around an outer circumferential portion of the trough body.

2. Fuel tank cover module according to claim 1, wherein the control unit in the installed state of the fuel tank cover module is disposed adjacent the hinge arm.

3. Fuel tank cover module according to claim 1, wherein the trough body comprises a laterally projecting housing extension, and wherein the fuel tank cover module further comprises a pivot pin disposed within the laterally projecting housing and rotatably coupling the hinge arm to the trough body.

4. Fuel tank cover module according to claim 3, wherein the control unit is mounted to an outer surface of the housing extension proximate the pivot pin.

5. Fuel tank cover module according to claim 1 wherein the trough body has an aperture, through which the rigid locking element engages, and that in the closed state of the fuel tank cover the locking portion is disposed adjacent to the aperture.

6. Fuel tank cover module according to claim 5, wherein the aperture is configured as a guide for the rigid locking element.

7. Fuel tank cover module according to claim 1, wherein the rigid locking element comprises a hook-shaped body.

8. Fuel tank cover module according to claim 1, wherein the rigid locking element comprises an elongate base portion that is engaged with the control unit, a middle portion that adjoins and extends transversely relative to the base portion, and an end portion that adjoins the middle portion and is configured to engage into the locking portion.

9. Fuel tank cover module according to claim 8, wherein the end portion of the rigid locking element extends substantially parallel and in particular in the opposite direction to the base position.

10. Fuel tank cover module according to claim 8, wherein the base portion and the end portion in the installed state of the fuel tank cover module are disposed substantially horizontally.

11. Fuel tank cover module according to claim 8, wherein the base portion and the end portion in the installed state of the fuel tank cover module are disposed mutually offset in vertical and horizontal direction.

12. Fuel tank cover module according to claim 3, wherein a direction of motion of the rigid locking element extends substantially at right angles to the pivot pin.

13. Fuel tank cover module according to claim 1, wherein the rigid locking element is movable by means of the control unit in a direction extending substantially along a longitudinal axis of the hinge arm.

14. Fuel tank cover module according to claim 1, wherein the control unit is configured as part of the preassembled fuel tank cover module.

15. Fuel tank cover module according to claim 1, wherein the control element is detachably fastened on the trough body.

16. Fuel tank cover module according to claim 1, wherein the control unit comprises at least one of the group consisting of a servomotor and an electromagnet.

17. Fuel tank cover module according to claim 1, wherein the fuel tank cover is formed integrally with the hinge arm.

18. A fuel tank cover module configured to be utilized in conjunction with a fuel tank cover, the fuel tank cover module comprising:
- a trough body including a generally annular wall, a housing extension projecting from the generally annular wall, and a guide aperture provided through the generally annular wall substantially opposite the housing extension, the trough body configured to enable the fuel tank cover to be hingedly mounted thereto;
- a control unit mounted to an outer surface of the housing extension; and
- a rigid hook-shaped locking element extending from the control unit, partially around the generally annular wall, and into the guide aperture, the rigid hook-shaped locking element configured to be moved by the control unit between: (i) a locking position wherein the rigid hook-shaped locking element locks the fuel tank cover in a closed position, when the fuel tank cover is hingedly mounted to the trough body, and (ii) a release position wherein the rigid hook-shaped locking element permits the fuel tank cover to be opened, when the fuel tank cover is hingedly mounted to the trough body.

\* \* \* \* \*